(No Model.)
H. G. MORGAN.
RUNNING GEAR FOR VEHICLES.
No. 256,238. Patented Apr. 11, 1882.
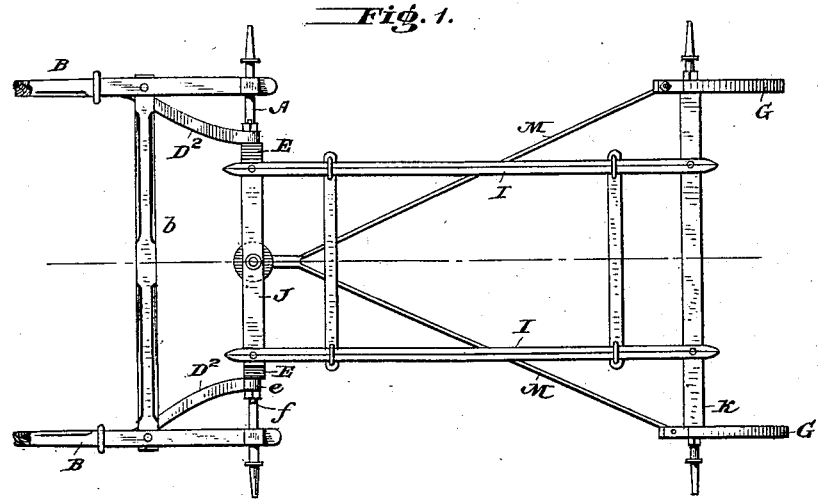
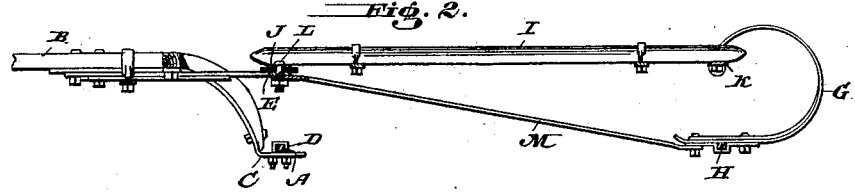
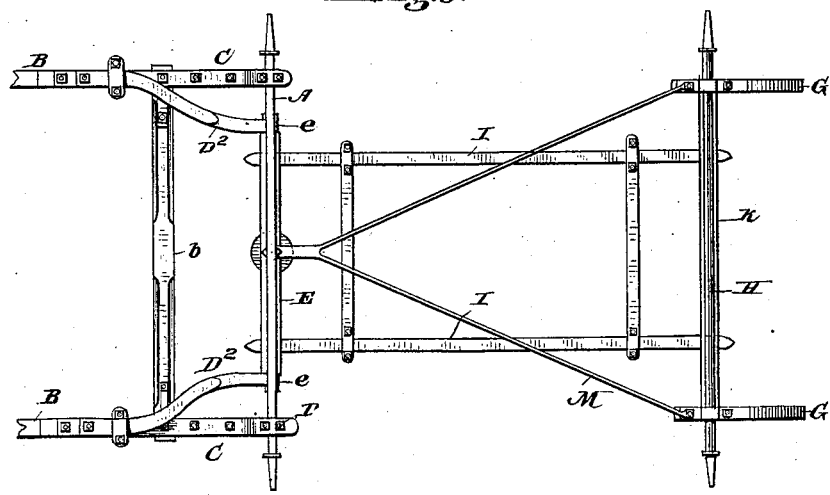
Witnesses:
Inventor
Henry G. Morgan.
By Paine, Grafton & Ladd.
Attorneys.

UNITED STATES PATENT OFFICE.

HENRY G. MORGAN, OF EAU CLAIRE, WISCONSIN.

RUNNING-GEAR FOR VEHICLES.

SPECIFICATION forming part of Letters Patent No. 256,238, dated April 11, 1882.

Application filed August 12, 1881. (No model.)

*To all whom it may concern:*

Be it known that I, HENRY G. MORGAN, a citizen of the United States, residing at Eau Claire, in the county of Eau Claire and State of Wisconsin, have invented certain new and useful Improvements in Running-Gears for Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to that class of running-gear for light vehicles in which the draft-thills are rigidly connected with the front axle and provided with rearwardly-extending springs, which, in connection with springs on the rear axle, serve to support the vehicle-body.

The object of the invention is to attain greater simplicity of construction, combined with strength, lightness, and durability in running-gear of the class above mentioned; and to these ends the invention consists in the construction and combination of parts, which will hereinafter be more fully described and then set forth in the claim.

In the drawings, Figure 1 is a plan view of a running-gear for vehicles embodying my improvements. Fig. 2 is a central longitudinal section of the same, and Fig. 3 is a bottom view.

The letter A designates the front axle of the vehicle, having customary end spindles or arms for the reception of the wheels.

The draft-thills B are connected by a cross-bar, $b$, and are generally provided with angular plates C at their rear ends, which plates fit under the axle, and are rigidly secured thereto by stirrup bolts or yokes D, the latter fitting on the axle and passing through the plates of the thills. Other means for connecting the thills with the front axle may, however, be resorted to. For example, ordinary thills as usually made can be rigidly attached to the axle by changing the construction of the thill irons or heads.

Springs $D^2$, attached to each thill in advance of the cross-bar thereof, extend in a rearward and inward direction, and terminate directly over the front axle. These springs are secured to the under side of the thills by means of clips, yokes, or other fastening devices, as is fully shown in Fig. 3, and the front or ends thereof are provided with eyes or sockets $e$, which run parallel with the axle A. A transverse spring, E, extending between the front ends of the longitudinal springs $D^2$, has bolt ends or spindles $f$, which pass through the eyes or sockets $e$, and have suitable nuts fitted thereon to retain the spring E in position. The latter is made somewhat elliptical in form, or, in other words, its center is higher than its ends, so that it will possess the requisite degree of elasticity. The body of the vehicle rests directly upon the front springs, $D^2$ and E, and is generally suspended from the free ends of upwardly and downwardly curved springs G, which are secured to the rear axle, H. No intermediate support is required between the front and rear points of attachment of the vehicle-body. The latter is in the present instance partly represented by the longitudinal side bars, I, which are suitably connected at their front ends by a cross-plate, J, and at the rear ends by a cross-bar, K, extending beyond said side bars. The front connecting-plate rests upon the transverse spring E, and is connected therewith by a king or turn bolt, L, which passes through the center of the spring and plate and made sufficiently long to receive a bottom screw-nut and the end of a bifurcated or converging brace-rod, M. The branches of said brace-rod, or rather the two rods diverging from the center of the cross-spring E to the outer portions of the rear axle, are secured by suitable bolts and nuts to the front ends of the lower arms of the springs G. These bottom arms of the springs are rigid and fixed upon the rear axle, to which they are secured by clamp or stirrup bolts or other fastening devices.

The ends of the rear cross bar or arm, K, of the carriage-body are shaped into bolts, which pass through eyes in the ends of the spring G, and are secured thereto by nuts.

It will be manifest from the above description that the carriage-body is only supported at the ends, thus permitting a light and inexpensive reach in the form of small brace-rods to be employed. A preponderance of weight on one side of the vehicle-body and an unequal depression of construction of running-gear will not cause one hind wheel to run in advance of the other, as in a running-gear known to me where the thills are rigidly connected with the front axle and the body is supported by front and rear springs and an intermediate reach.

Having thus described my invention, what I claim as new, and desire to secure by Letters Patent, is—

In a running-gear for vehicles, the combination of the front axle, the thills rigidly attached thereto, the longitudinal rearwardly-extending springs attached to the thills and terminating over the front axle, the transverse spring, connected with the rear ends of the longitudinal springs, the rear axle having curved springs, and the vehicle-body resting and turning upon the front springs and suspended from the rear springs, as and for the purpose set forth.

In testimony whereof I affix my signature in presence of two witnesses.

HENRY G. MORGAN.

Witnesses:
J. F. ELLIS,
JAMES F. SALSBURY.